United States Patent
Rios et al.

(10) Patent No.: US 9,359,695 B2
(45) Date of Patent: Jun. 7, 2016

(54) LIGNIN-BASED ACTIVE ANODE MATERIALS SYNTHESIZED FROM LOW-COST RENEWABLE RESOURCES

(75) Inventors: Orlando Rios, Knoxville, TN (US); Wyatt Evan Tenhaeff, Knoxville, TN (US); Claus Daniel, Knoxville, TN (US); Nancy Johnston Dudney, Knoxville, TN (US); Alexander Johs, Knoxville, TN (US); Grady Alexander Nunnery, Rock Hill, SC (US); Frederick Stanley Baker, Kailua-Kona, HI (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 952 days.

(21) Appl. No.: 13/567,275

(22) Filed: Aug. 6, 2012

(65) Prior Publication Data
US 2014/0038034 A1   Feb. 6, 2014

(51) Int. Cl.
| | |
|---|---|
| *H01M 4/36* | (2006.01) |
| *D01F 1/10* | (2006.01) |
| *D01F 9/17* | (2006.01) |
| *H01M 4/133* | (2010.01) |
| *H01M 4/1393* | (2010.01) |
| *H01M 4/587* | (2010.01) |
| *B82Y 40/00* | (2011.01) |
| *H01M 4/04* | (2006.01) |
| *H01M 10/0525* | (2010.01) |
| *B82Y 30/00* | (2011.01) |

(52) U.S. Cl.
CPC .. *D01F 1/10* (2013.01); *D01F 9/17* (2013.01); *H01M 4/133* (2013.01); *H01M 4/1393* (2013.01); *H01M 4/587* (2013.01); *B82Y 30/00* (2013.01); *B82Y 40/00* (2013.01); *H01M 4/0471* (2013.01); *H01M 10/0525* (2013.01); *Y02E 60/122* (2013.01); *Y02P 70/54* (2015.11); *Y02T 10/7011* (2013.01)

(58) Field of Classification Search
CPC ... H01M 4/133; H01M 4/1393; H01M 4/587; H01M 4/0471; H01M 10/0525; D01F 1/10; D01F 9/17; Y02E 60/122; Y02T 10/7011; B82Y 40/00; B82Y 30/00
See application file for complete search history.

(56) References Cited

U.S. PATENT DOCUMENTS

| | | | | |
|---|---|---|---|---|
| 2008/0025906 A1* | 1/2008 | Lin | ......... | B82Y 30/00 423/448 |
| 2011/0285049 A1* | 11/2011 | Baker | ..... | B29C 47/38 264/105 |
| 2012/0214375 A1* | 8/2012 | Kitano | ..... | D01D 5/0038 442/336 |
| 2013/0118886 A1* | 5/2013 | Bridgwater | ..... | C10B 47/24 201/20 |
| 2013/0224579 A1* | 8/2013 | Berrang | ..... | H01M 4/14 429/204 |
| 2013/0338347 A1* | 12/2013 | Cao | ..... | C07G 1/00 530/500 |

OTHER PUBLICATIONS

Braun et al., "Lignin-based carbon fibers: Oxidative thermostabilization of kraft lignin," Science Direct, Carbon 43 (2005) 385-394, Elsevier.

Fly et al., "Pyrolytic Carbons from Porogen-treated Rice Husk as Lithium-insertion Anode Materials," *International Journal of Chemical Engineering and Applications*, vol. 2, No. 1, Feb. 2011.

Kercher et al., "Carbon Fiber Paper Cathodes for Lithium Ion Batteries," *Journal of the Electrochemical Society*, 157 (12) A1323-A1327 (2010).

Snyder et al., "Evaluation of Commercially Available Carbon Fibers, Fabrics, and Papers for Potential Use in Multifunctional Energy Storage Applications," *Journal of the Electrochemical Society*, 156 (3) A215-A224 (2009).

Xiao et al., "The chemical modification of lignins with succinic anhydride in aqueous systems," *Polymer Degradation and Stability* 71 (2001) 223-231, Elsevier.

* cited by examiner

*Primary Examiner* — Muhammad Siddiquee
(74) *Attorney, Agent, or Firm* — Fox Rothschild LLP

(57) ABSTRACT

A method of making an anode includes the steps of providing fibers from a carbonaceous precursor, the carbon fibers having a glass transition temperature $T_g$. In one aspect the carbonaceous precursor is lignin. The carbonaceous fibers are placed into a layered fiber mat. The fiber mat is fused by heating the fiber mat in the presence of oxygen to above the $T_g$ but no more than 20% above the $T_g$ to fuse fibers together at fiber to fiber contact points and without melting the bulk fiber mat to create a fused fiber mat through oxidative stabilization. The fused fiber mat is carbonized by heating the fused fiber mat to at least 650° C. under an inert atmosphere to create a carbonized fused fiber mat. A battery anode formed from carbonaceous precursor fibers is also disclosed.

20 Claims, 16 Drawing Sheets

LIGNIN-BASED ACTIVE ANODE MATERIALS SYNTHESIZED FROM LOW-COST RENEWABLE RESOURCES

STATEMENT REGARDING FEDERALLY SPONSORED RESEARCH

This invention was made with government support under contract No. DE-AC05-00OR22725 awarded by the U.S. Department of Energy. The government has certain rights in this invention.

FIELD OF THE INVENTION

The present invention relates to battery electrodes, and more particularly to carbon fiber battery electrodes.

BACKGROUND OF THE INVENTION

Lithium-ion battery packs in hybrid electric vehicles (HEVs) and fully electric vehicles (EVs) in the near term will contain carbon-based active materials in the anode. However, full market penetration will require further non-incremental improvements in cyclic capacity at lower costs. Typical state of the art lithium battery anodes are composites of 90% (by mass) graphitic carbon and 10% polymeric binder coated onto metallic copper current collectors.

Previous work at the Oak Ridge National Laboratory (ORNL) has shown that good performance can be achieved on the cathode side by replacing the binder and current collector with highly conductive graphitic carbon fibers. In this work, particles of the cathode active material were coated directly onto the carbon fiber; the carbon fibers were the backbone of the electrode architecture and conduit for electron transport to the active material but did not participate in lithium intercalation. Attempts have been made to utilize these carbon fibers as the active material on the anode side, but low capacities were realized due to alignment of the basal planes of graphite crystallites parallel to the carbon fiber axis. The basal plane is effectively a barrier to lithium diffusion; lithium insertion is limited to defect sites in the plane. Researchers at the U.S. Army Research Laboratory recently presented results from their characterization of commercially available carbon fibers and related structures as anodes in lithium ion batteries. The best reversible electrochemical capacity was 158 mAh g$^{-1}$, less than half the theoretical capacity of graphite. The authors note that carbon fibers for the composite industries typically consist of a disordered carbon core surrounded by a graphitic sheath, which may explain the low capacities obtained in the study.

The intercalation compound of lithium with graphite with a stoichiometry of LiC$_6$ corresponds to a theoretical charge capacity of 372 mAh·g$^{-1}$. It has been demonstrated that it is possible to surpass this capacity using several modifications of carbon and graphite, many of which do exceed the theoretical charge capacities. However, in many cases of high capacity carbons (hard carbons and disordered carbons), the stability upon cycling is limited. Activated carbons containing micropores (<2 nm) and no mesopores (2 to 50 nm) were shown to reversibly insert lithium electrochemically in non-aqueous salt solutions. Although activated carbons can be prepared with specific surface areas as high as 2500-3000 M$^2$·g$^{-1}$ by extensively developing their porosity, they usually possess a very wide pore size density of the material.

Carbon fibers are mixed ionic/electronic conductors that can have relatively high electrical conductivities >10-50 S/cm. The microstructure and graphitic content of carbon fibers are critical for effective insertion of lithium into carbon fibers; the microstructure should be controlled such that the graphene planes of graphite crystallites are oriented off-parallel to the fiber axis. Charge storage capacities in carbon fibers derived from mesophase pitch with a radial texture are comparable to those of graphite, but pitch-based fibers are expensive. Pyrolytic carbons from rice husks have been shown to have reversible capacities over 700 mAh g$^{-1}$ for several hundred cycles; however, the additional processing steps required for binding the powder form graphite dominates its cost. Previous studies on the pyrolysis of epoxy for battery applications have shown that turbostratic disorder and crystallite size significantly increase the specific capacity from under 200 mAh g$^{-1}$ to over 700 mAh g$^{-1}$.

SUMMARY OF THE INVENTION

A method of making an anode includes the step of providing fibers from a carbonaceous precursor. The carbonaceous fibers have a glass transition temperature T$_g$. The carbonaceous fibers are placed into a layered fiber mat. The fiber mat is fused by heating the fiber mat in the presence of oxygen to above the Tg but no more than 20% above the T$_g$ to fuse fibers together at fiber to fiber contact points and without melting the bulk fiber mat to create a fused fiber mat through oxidative stabilization. The fused fiber mat is carbonized by heating the fused fiber mat to at least 650° C. under an inert atmosphere to create a carbonized fused fiber mat.

The carbonaceous precursor fibers can be lignin fibers. The lignin fibers can be melt spinnable, or blowable, or formed from the carbonaceous lignin precursor by any suitable method. The fibers can have a diameter between 1 and 300 µm.

The fusing step can include heating the fiber mat at heating rates of from 0.03° C./min to 10° C./min. The fusing step can include heating the carbon fiber to between about 180 and about 300° C. The carbonizing step can include heating the fused fiber mat at a rate of between 0.5° C./min and 500° C./min. The carbonizing step can include heating the fused fiber mat to between 650° C. and 3000° C. The carbonizing step can include determining a desired level of graphitization in the anode, and adjusting the carbonization temperature depending on the degree of carbonization, increasing graphitization being attained by increasing the carbonization temperature.

The step of providing carbon fibers can include mixing carbon nanotubes with the carbonaceous precursor to generate carbon nanotube composite fibers. The carbon nanotubes can comprise between about 0.2% and about 10%, by weight.

The step of providing carbon fibers comprises chemically modifying functional groups on the carbonaceous precursors. The chemical modification step can comprise reacting the precursors with at least one selected from the group consisting of acetic anhydride, succinic anhydride, maleic anhydride and phthalic anhydride.

The step of providing carbon fibers can comprise providing a lignin precursor, and forming fibers from the lignin precursor. The lignin precursor is ground to produce a lignin powder. The lignin powder is extruded and cut into pellets, and the pellets are subjected to one of melt spinning and melt blowing to produce lignin fibers.

The carbonized fused fiber mat can be incorporated as the anode of a battery. The anode can have capacity of over 100 mAh g$^{-1}$ for at least 10 cycles. The anode can have a reversible capacity of at least 100 mAh g$^{-1}$. The anode can have a reversible capacity of at least 150 mAh g$^{-1}$.

A lithium ion battery can include a cathode layer, a lithium salt electrolyte disposed in operable relationship with the cathode layer; and a carbon fiber mat anode layer disposed in operable relationship with the lithium salt electrolyte layer. The carbon fiber mat anode layer can have a carbon fiber mat that has been fused at fiber to fiber contact points and carbonized.

The carbon fiber mat anode layer can also comprise the anode current collector. The carbon fiber can be derived from lignin. The anode can have a specific charge capacity of over 100 mAh g$^{-1}$ for at least 10 cycles. The anode can have a reversible charge capacity of at least 100 mAh g$^{-1}$. The anode can have a reversible charge capacity of at least 150 mAh g$^{-1}$.

An anode for a battery, comprising a carbon fiber mat anode layer, the carbon fiber mat anode layer comprising a carbon fiber mat that has been fused at fiber to fiber contact points and carbonized.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
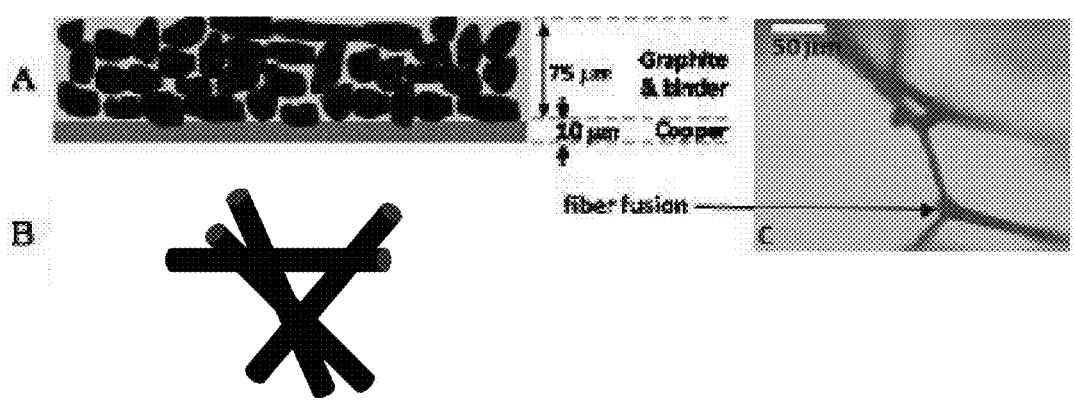
FIG. 1 is A) a schematic cross-sectional view of a conventional anode design for lithium ion batteries; B) a schematic of an anode design according to the invention; and C) an optical micrograph of lignin fibers, thermally fused during the early stages of stabilization.

A method of making an anode according to the invention provides fibers from carbonaceous precursors. The carbon fibers have a glass transition temperature $T_g$. The carbon fibers are placed into a layered fiber mat. The fibers are then fused together into a fused fiber mat by heating the fiber mat in the presence of oxygen to above the $T_g$ but no more than 20% above the $T_g$ in an oxidation stabilization process. The fusing step should fuse the fibers together at fiber to fiber contact points but without melting the bulk fiber mat to create a fused fiber mat through oxidative stabilization. The fused fiber mat is then carbonized by heating the fused fiber mat to at least 650° C. under an inert atmosphere to create a carbonized fused fiber mat.

The carbon fibers can be made from many different carbonaceous precursor fibers. A preferred carbonaceous precursor fiber material is lignin. Other precursor fiber materials are polyacrylonitrile (PAN), rayon and pitch. The carbonaceous fiber precursor materials can be formed into fibers by any suitable process. These processes include, but are not limited to, melt spinning and blow molding. One or more processes can be performed to reduce the diameter of the precursor fibers. Fibers having a diameter of between about 1 μm and about 300 μm can be used. In another example, fibers of between 1 μm and 1000 μm can be used. The precursor fibers are formed into mats. The fibers within the mats should be arranged in a disordered manner or in a directionally oriented layered structure with a rotation in-between layers, to create many fiber to fiber contacts which when fused together will provide both electrical connectivity through the mat as well as void spaces for liquid electrolyte infiltration, which are necessary for Li ion transport to the surface of the LCFs.

Lignin-based carbon fibers (LCFs) exhibit controllable turbostratic disorder, which distinguishes them from typical carbon fibers and conventional anode material. If the material does not exhibit turbostratic order, processes can be performed to create mats with activated fibers. Activation can be used to decrease the solid state diffusion length for Li in lieu of having extensive turbostratic disorder. Other established fiber mat production techniques can also be applied to the "green" lignin fibers prior to carbonization. Various aspect ratio fibers can be synthesized conventionally and under high magnetic fields to manage the surface to bulk ratios and mechanical strength along with interfacial and transport properties through structural control. Tailoring of the aspect ratios provides a means of controlling the solid state diffusion length or the distance Li-ions must travel within the bulk material. Carbonization under high magnetic fields is linked to enhanced mechanical properties that are important to capacity retention over many cycles as well as rate performance. Intercalation of Li-ions into graphite results in a lattice expansion that drives failure mechanism. By increasing the mechanical properties the probably of failure at a give stress level are minimized therefore allowing for a higher rate of discharge without sacrificing battery life.

Lignin-based carbon fibers (LCFs) have an advantage in that the lignin precursor is a renewable resource. Lignin, a branched polyphenolic polymer, is extracted in abundance from biomass in paper mills and future biorefineries. Due to lignin's low cost, a significant improvement over the average cost of battery-grade graphite can be obtained. Additionally, anodes made from lignin-based carbon materials can be fabricated without binders and secondary contacts, which substantially reduces the cost of the battery anode. The isotropic nature (i.e., turbostratic disorder) of the LCF provides a good interface for Li insertion while allowing for the accommodation of insertion-induced stresses.

The fusing step can be performed by any suitable method. The fusing step must be performed such that the bulk fibers do not melt. The fusing step must also be performed such that the fibers fuse at fiber to fiber contact points, but are not softened to the point that the fibers melt and agglomerate together. The LCF fibers when heated slightly above the $T_g$ will partially melt at high energy surfaces, which results in fusion of the contacting fibers. It has been found that fusing can be performed by heating the fibers to no more than about 20% above the $T_g$ of the fiber, for example, lignin has a $T_g$ of 150° C. and such a LCF mat would be fused at temperatures which should not exceed 180° C. In some embodiments the fibers can be heated to no more than 10, 11, 12, 13, 14 15, 16, 17, 18, 19% above the $T_g$. Heating temperatures for the fusing step can be between about 150° C. and about 300° C. The $T_g$ continuously increases during the oxidative stabilization and the fibers may not be heated at a higher rate than the rate of increase of the $T_g$. The rate of heating during the fusing step can be controlled. In one aspect, the rate of heating is between 0.03° C./min to 10° C./min.

Lignin has a glass transition temperature that is far below the temperatures that are required for carbonization. Accordingly, the lignin fibers would melt if untreated before carbonization could occur. It is therefore necessary to oxidatively stabilize the lignin to effectively raise the $T_g$ prior to carbonization. The stabilization step can be performed before, during or after the fusing step, but before the mat is subjected to carbonization temperatures. In one aspect, the fusing step can be accompanied by the oxidative stabilization step. Oxidative stabilization can be performed after the fusion step. The fusion could be performed in vacuum or inert atmosphere completely preventing any oxidation. The materials can be oxidized after this step.

Oxidative stabilization is a known process by which carbon fiber precursor material is heated in the presence of oxygen to stabilize (thermoset) the material by crosslinking and thereby prevent melt flow, foaming and local expulsion of the material during the subsequent high temperature carbonization.

The carbonization step can be performed by any suitable methodology. The temperature of the fused fiber mat is preferably raised to at least 650° C., or at least 800° C., during the carbonization step. Carbonization temperatures of 3000° C. or more are possible. The rate of heating during the carbonization step can be controlled. In one aspect, the rate of heating during the carbonization step is between 0.5° C./min and 500° C./min.

The carbonization step will produce carbon fiber mats that comprise carbon fibers that have turbostratic disorder with electrically connected fibers and substantial void space. The void space can be between 10% and 90%, by volume, and is preferably within about 50 and about 90%, by volume. The fibers have a resistivity of 5 to 1400 mohm·cm, and can have a resistivity of between 5 and 140 mohm·cm. Lower resistivities are possible In graphite, charge storage occurs through the intercalation of lithium into galleries between graphene planes, while in disordered carbons, lithium inserts into various structures within the material—nanoscale pores for examples. Lignin fiber materials of varying structure, porosity and bulk morphology are possible. The relative amounts of crystallite and amorphous phases can be tailored using precursor modification and specific thermal profiles. Control of the stabilization and carbonization of lignin is possible to tailor the electrochemical performance of the anode material. Such control can be effected by controlling the heating rate of the stabilization and the carbonization. Control can also be effected by controlling the temperature of the oxidative stabilization, the fusing step, and the carbonization step.

The mats can be incorporated as electrodes in many different ways and in different battery types, sizes and designs. The invention is suitable for lithium batteries as well as other battery systems using other ions. It is also possible to incorporate LCFs processed according to the invention in traditional battery designs. There is shown in FIG. 1 a schematic diagram of an example of a LCF cell that has been produced by joining the fibers in a binder/slurry. A conventional binder is poly(vinylidene difluoride). The bound fibers are coating onto a metallic current conductor such as copper. Also in FIG. 1 is a schematic diagram of a carbon fiber mat according to the invention in which the fibers are fused according to the and as shown in the micrograph in FIG. 1. The mat is electrically conductive and so the anode does not need to have a current collector.

The relative amounts of crystallite and amorphous phases can be tailored using specific thermal profiles. It has been shown that the pyrolysis of carbonaceous materials to produce graphite under extreme conditions (high magnetic fields) decreases crystallite size and increases the d002 spacing while significantly improving mechanical properties. High magnetic fields and temperatures can be used selectively to integrate the oxidation and pyrolysis of carbonaceous materials under extreme conditions (high magnetic fields such as over 2 T) at temperatures up to 2300° C. while focusing on minimizing processing temperatures. The lignin fiber aspect ratio can also be varied through control of melt spinning parameters. The surface to bulk ratio is inversely proportional to the solid state diffusion length therefore as surface area increases the solid state diffusion length decreases. Fibers with diameters ranging from 1 mm to 1 um can be produced by adjusting the melt spinning parameters.

Figure 7:
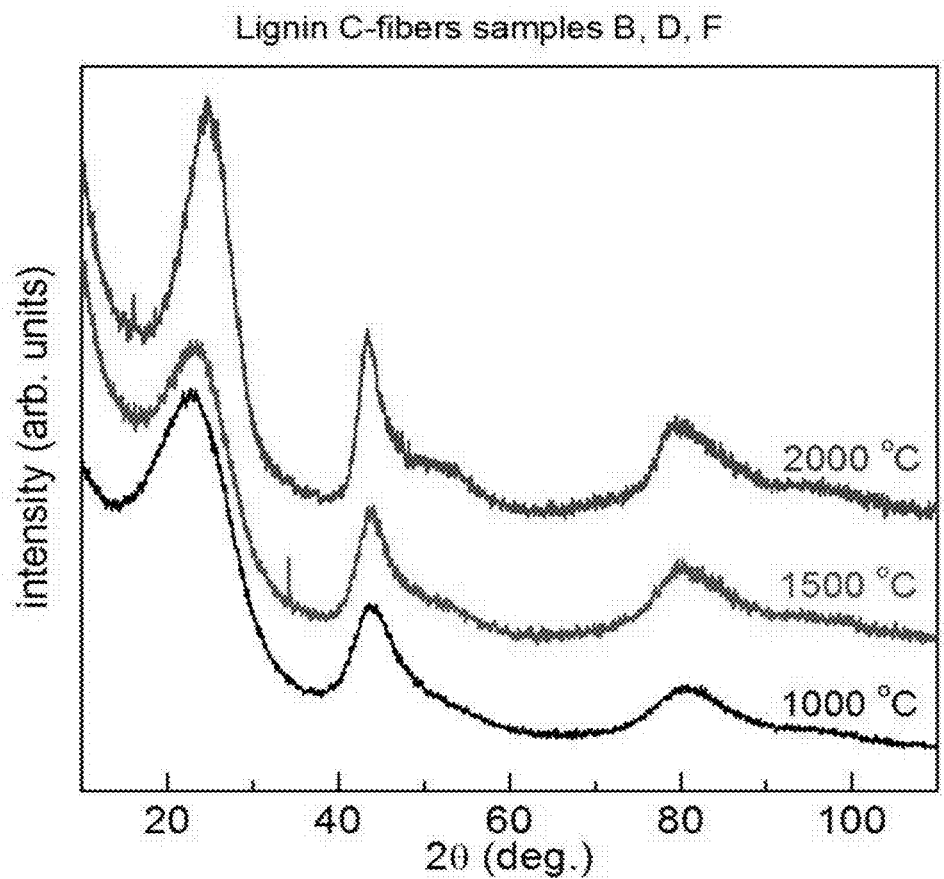
FIG. 7 is an X ray diffraction (XRD) plot of intensity vs 2θ (deg.) for lignin carbon fiber samples.
Figure 8:
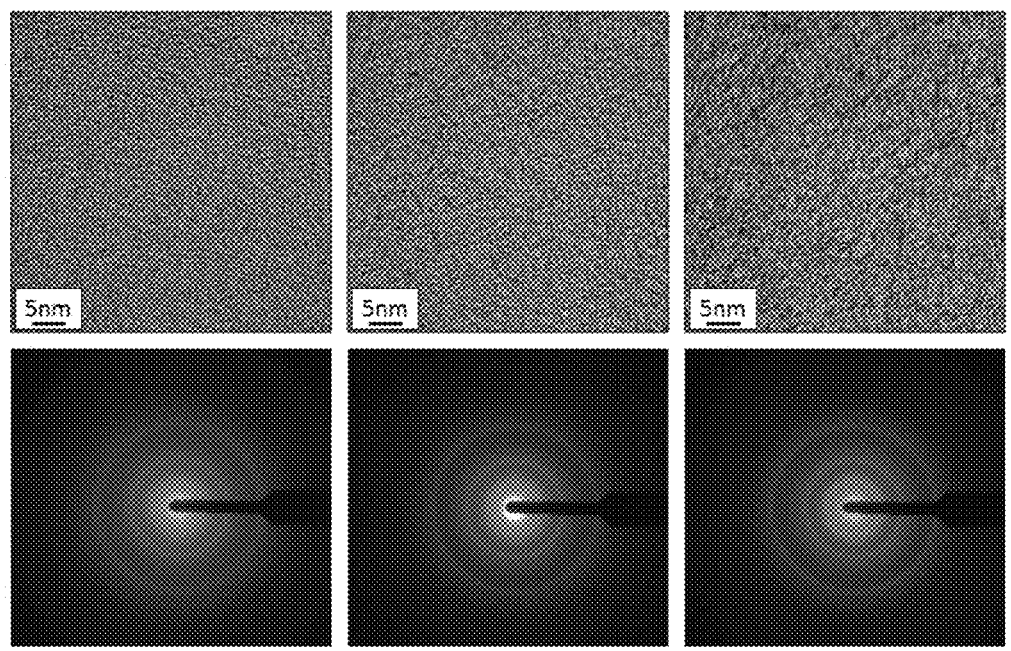
FIG. 8 are transmission electron microscopy (TEM) images of lignin fiber samples.

LCFs can provide enhancements in specific charge storage capacities relative to graphite. Disordered carbons derived from the carbonization of cross-linked organic precursors with chemical structures similar to lignin show significant enhancements over the theoretical specific charge storage capacity of 372 mAh g$^{-1}$ for graphite. Reversible capacities over 1000 mAh g$^{-1}$ have been demonstrated. The microstructure, porosity, defect and graphitic content, and architecture of LCFs can be readily tailored by control of the extrusion geometry along with the stabilization and carbonization thermal cycle. Melt spinning of lignin and subsequent carbonization under the appropriate conditions yield tunable crystallite distributions that range from 0.9 to 3.3 nm for materials carbonized at 1000° C. to 2500° C. respectively that have a nearly random distribution of orientations while facilitating control of the ratio between the graphitic and disordered phases, as shown in FIG. 8. As shown in FIGS. 7 and 8, material carbonized at 1000° C. is amorphous and material carbonized at 2000° C. is mostly graphitic.

A LCF anode material with a narrow pore size distribution in the <2 nm range will facilitate optimal diffusion and intercalation efficiency of Li ions with minimal loss in conductivity and cycling stability. Nanoscale porosity decreases the solid diffusion length resulting in increased rate performance and capacity. This can be accomplished by optimizing precursor composition, crosslinking agents and use of physical or chemical activation. Physical activation is performed by treatment of the carbonized fibers using $CO_2$ or steam. Chemical activation is performed during carbonization using activation reagents such as $K_2CO_3$, $ZnCl_2$ and $H_3PO_4$. In combination with variation of process control parameters. Activation reagents can affect the evolution of volatile compounds during carbonization controlling the development of microscale porosity and surface area.

Figure 10:
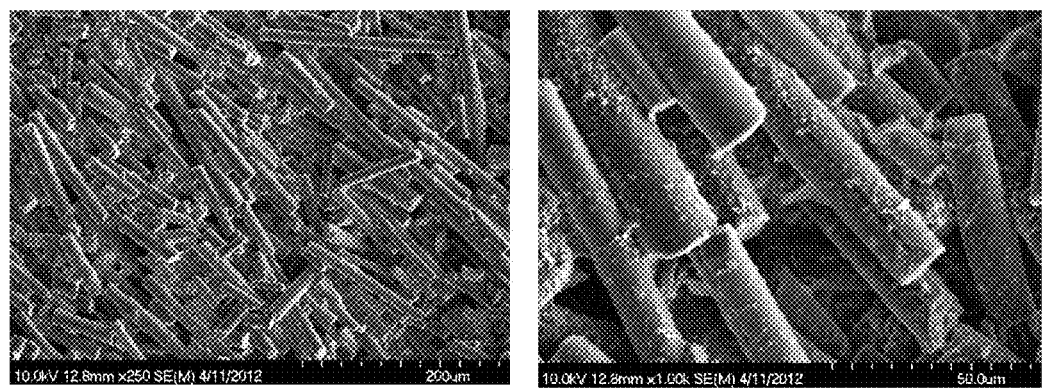
FIG. 10 are SEM images of carbon fiber electrodes coated onto copper current collectors using slurry processing.

The electrochemical performance of LCFs was characterized in conventional composite anode architectures, shown conceptually in FIG. 1 and in the SEM of FIG. 10, to enable the utilization of existing fabrication methods and equipment, along with well-established electrochemical characterization protocols (e.g. galvanostatic cycling in coin cells). The anodes were cycled in half cells against Li metal. Emphasis was placed on the initial irreversible capacities and reversible capacity retention over at least 100 cycles. The benchmark for reversible capacity can be set by the theoretical capacity of graphite: 372 mAh $g^{-1}$. Cycling was conducted at various charge/discharge rates to demonstrate the rate performance of the materials.

The performance of LCF anodes in Li-ion batteries depends on features of the structure of the fibers themselves, combined with Li intercalation and ion transport mechanisms within the fiber and fiber/electrolyte interface. Of particular importance are the size distribution of the carbon crystallites, the size and distribution of pores and voids, the degree of preferential orientation of crystalline material in the LCF, and the structure formed by intercalated Li ions.

Lignin is extracted in abundance from biomass in paper mills and biorefineries. Raw lignin materials are extracted from pulp mill byproducts using several methods that are suitable for melt processing. In these examples hard wood lignin was used that was extracted using an organosolv process. Unlike conventional carbon fiber precursors lignin is a complex 3D a branched polyphenolic polymer with a wide molecular weight distribution.

A chemical modification step may be performed which consist of reacting the functional groups. The function of the chemical activation is to induce a mesoporous structure during the conversion process.

The lignin precursor may be modified using an anaerobic heat treatment in order to remove volatiles (low molecular weight carbonaceous molecules). The lignin is ground to into a powder using a ball mill or other mechanical powdering methods. Carbon nanotubes (CNT) may be incorporated and dispersed into the powder to generate CNT composite fibers. After conversion CNT fiber have a lower electrical resistivity. The ground powder is pelletized using a single or multi screw extruder at temperatures ranging from 150 to 250° C. Reactions with air are kinetically limited by minimizing the dwell time in the hot portion of the extruder to less than 10 min or by maintaining an oxygen deficient atmosphere (inert gas or nitrogen). The lignin is extruded with a diameter of 2 to 8 mm onto a moving belt and cut into pellets of 5 to 10 mm directly on the belt. Alternatively the pellets may be cut at the die face.

The pellets are then loaded into a melt spinning apparatus. The melt spinning apparatus can be capable of short dwell times and inert atmospheres to produce fibers from the precursor. Any suitable melt spinning and melt blowing process can be utilized. In melt spinning 10 or more fibers can be continuously extruded with a diameter of 1 μm to 300 μm and wound on a take up spool. The linear velocity of the take up spool is up to 50× the velocity of the fiber at the die face (15× in this example). This draws down the fiber diameter. The extrusion process is performed at 150° C. to 300° C. under inert atmospheres. In melt blowing the fibers are drawn down to similar diameters using a forced air venturi. The fibers are blown onto a moving substrate at several feet per min. Other methods for reducing the fiber diameter are possible.

The melt spun materials are cut off the spool and placed into a layered fiber mat. Due to poor tensile strength of the lignin polymer fibers it is not possible to form a woven mat. The melt blown materials are removed from the polymer backing.

The materials are oxidized/stabilized to increase the $T_g$ sufficiently to allow for conversion into carbon fibers. This heat treatment is performed under flowing air at heating rates from 0.03 to 10° C./min up to 220° C. The exact heating rate is selected to optimize the mat density and the extent of fiber-fiber fusion. This fusion step is important in generating an electrically connected 3D structure. The method of fiber-fiber fusion is to heat the polymer materials at a sufficient aggressive heating rate that partial melt fusion occurs only at high energy surfaces (contact points between fibers). The exothermic oxidation reaction must be balanced with the heat capacity of the fiber such that a overheating does not occur.

Oxidation and fiber-fiber fusion may be performed in a high magnetic field (greater than 2 T) in order to accelerate the reaction kinetics by enhancing the formation of free radicals. This increases the stabilization kinetics by up to an order of magnitude.

Figure 5:
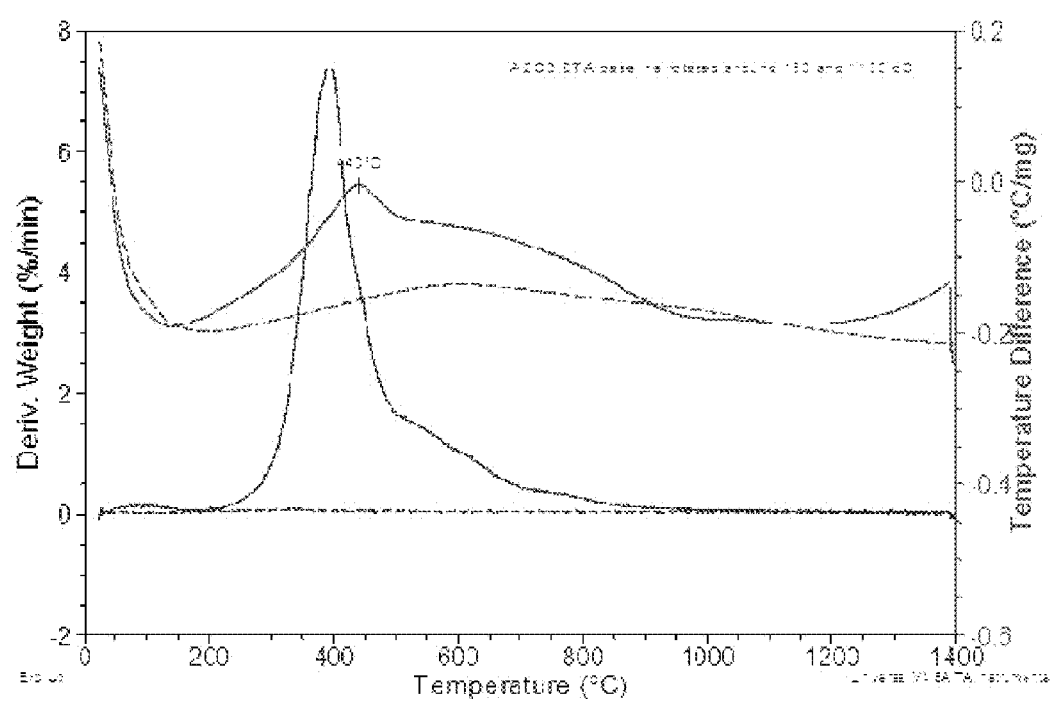
FIG. 5 is a plot of derivative weight (%/min) and temperature difference (° C./mg) vs. temperature (° C.) for lignin fiber mats.
Figure 6:
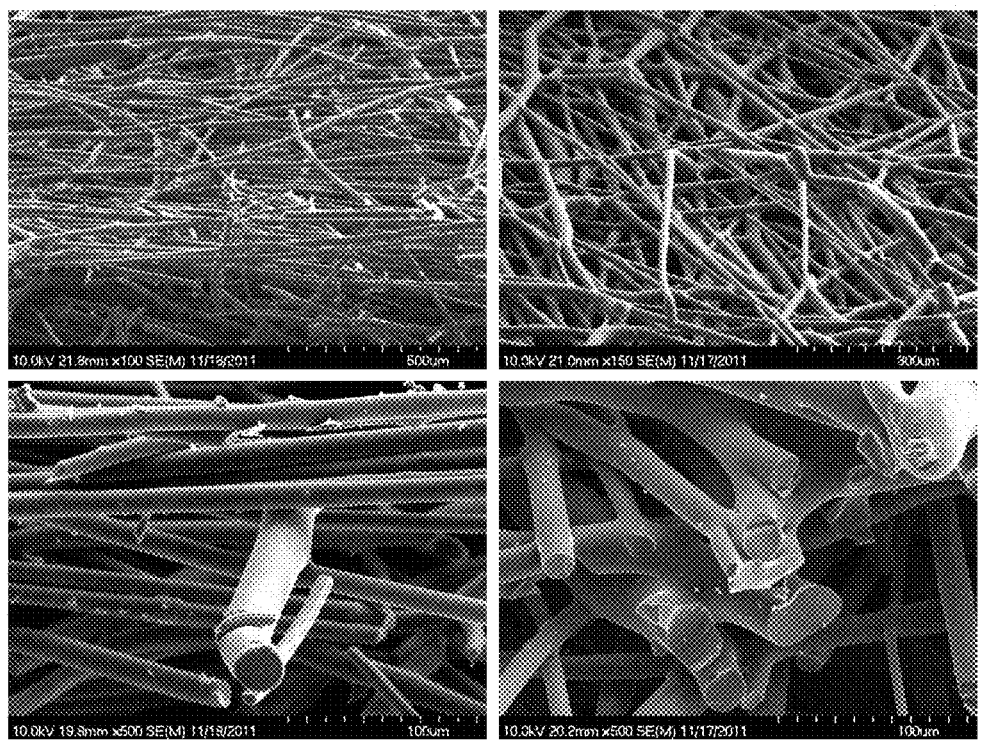
FIG. 6 are scanning electron microscopy (SEM) images of high density (right—10% open volume) and low density (left—80% open volume) lignin fiber electrodes.

The stabilized and fused polymer mat is then converted into carbon fibers (highly carbonaceous materials) with varying degrees of graphitic order. This is performed by heating the mats under an inert atmosphere (nitrogen or inert gas) above 800° C. at a heating rate of 10° C./min. At this point the material loses mass as all the low atomic mass elements are driven off leaving behind a carbonaceous material in fiber form (FIG. 5). The morphology of 2 examples of high density (top—10% open vol) and low density (bottom—80% open volume) lignin carbon fiber electrodes are shown in FIG. 6.

Figure 9:
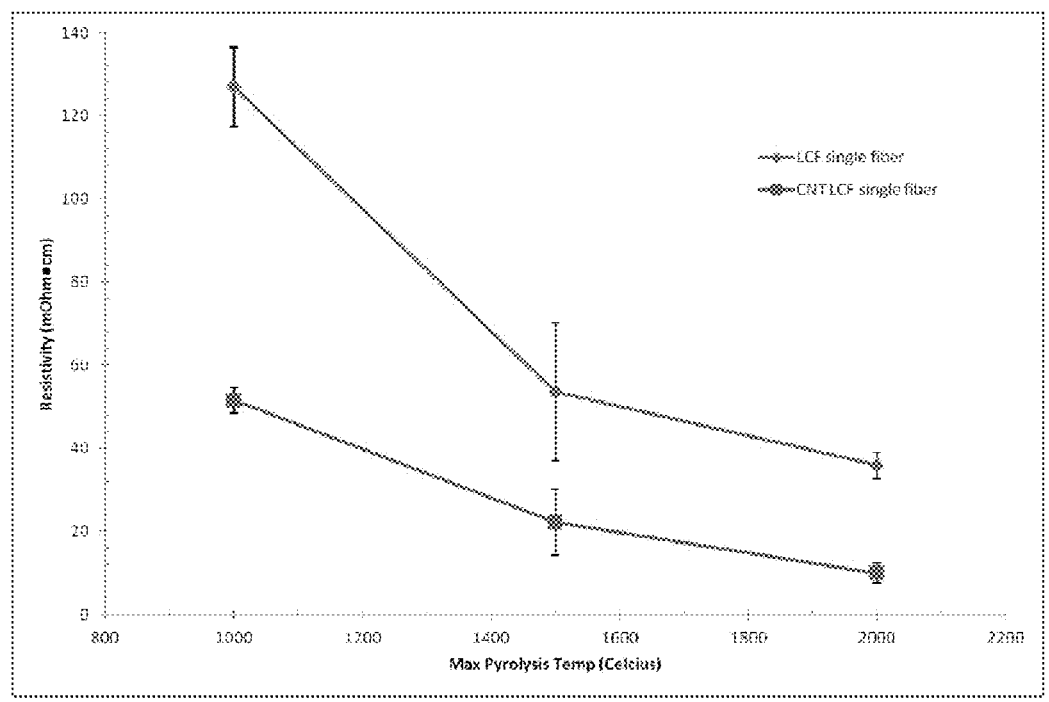
FIG. 9 is a plot of resistivity (mOhm·cm) vs. max pyrolysis temperature (° C.) for a conventional lignin carbon fiber and for a carbon nanotube (CNT) composite carbon fiber.

The graphitic content of the fibers is controlled by selecting the high temperature heat treatment. In this example heat treatments of 1000° C., 1500° C. and 2000° C. were utilized. The graphitic content controls the electrical conductivity and electrochemical performance. FIG. 9 shows the change in electrical resistivity with heat treatment temperature for both a conventional lignin carbon fiber and for a CNT composite lignin carbon fiber. The microstructure and graphitic content are characterized by X-ray diffraction (FIG. 7) and Transmission electron microscopy (FIG. 8). TEM micrographs reveal that the local order or nearest neighbor correlation distance is similar in all the samples, however the long range order increases with heat treatment temperature (as evident in the center diffraction pattern). Unlike conventional carbon fiber materials, lignin carbon fibers contain nanoscale microstructure with perfect turbostratic disorder (evident in the ring patterns and confirmed by other methods). This microstructure is distinct from the aligned structures of conventional carbon fibers and is linked to the electrochemical performance and cyclic life.

For slurry processing of electrode materials the carbon fiber mats are ground into powders consisting of 20 to 50 μm long short fibers. SEM images of a typical slurry are shown in FIG. 10. For the lignin carbon fiber 3D electrodes no further preparation is required. The materials are simply punching into correct size for a coin cell or sectioned for a pouch cell configuration.

LCFs were synthesized. LCFs were ground into smaller particle sizes. Fibrous morphologies with high aspect ratios were maintained. LCFs were mixed with polyvinylidene fluoride (PVDF) binder and conductive carbon additives in a mass ratio of 83:15:2 (LCF:PVDF:conductive carbon). These solid materials were dispersed in N-methylpyrrolidone (NMP) solvent to create a viscous slurry. The slurry was coated onto a 12 micrometer-thick copper current collector using a doctor blade. Typical thicknesses of the coated slurry prior to drying were 4 and 6 mil. The coated slurry was dried to remove residual NMP. The electrodes were calendared at constant thickness, typically 75% of the thickness after removing NMP.

Samples were dried in a moisture-free environment to eliminate adsorbed water. ⅝" discs of the coated material were punched. Inside a glovebox with a water concentration below 1 ppm, the discs were inserted into a 2032 coin cell. A few drops of electrolyte were placed on top of the LCF electrode. An electrolyte-saturated porous separator (manufactured by Celgard) was placed on top of the electrode. Lithium metal was placed on top of the separator, and the coin cell was crimped to form an air-tight seal. The electrolyte composition was 1.2 M $LiPF_6$ in EC:DMC (3:7, by volume), a common composition for lithium ion batteries. The cells were galvanostatically cycled between 0.005 and 1.5 V. At the top of the lithium extraction step (1.5 V), cell voltages were maintained at 1.5 V until the current dropped to 5 µA or below. The rates used in each cycle are shown in Table 1.

TABLE 1

| Cycle #'s | Li Insertion and Extraction Rates (mA/g LCF) |
|---|---|
| 1-3 | 15 |
| 4-8 | 30 |
| 9-13 | 60 |
| 14-18 | 180 |
| 19-23 | 360 |
| 23-... | 15 |

Figure 2:
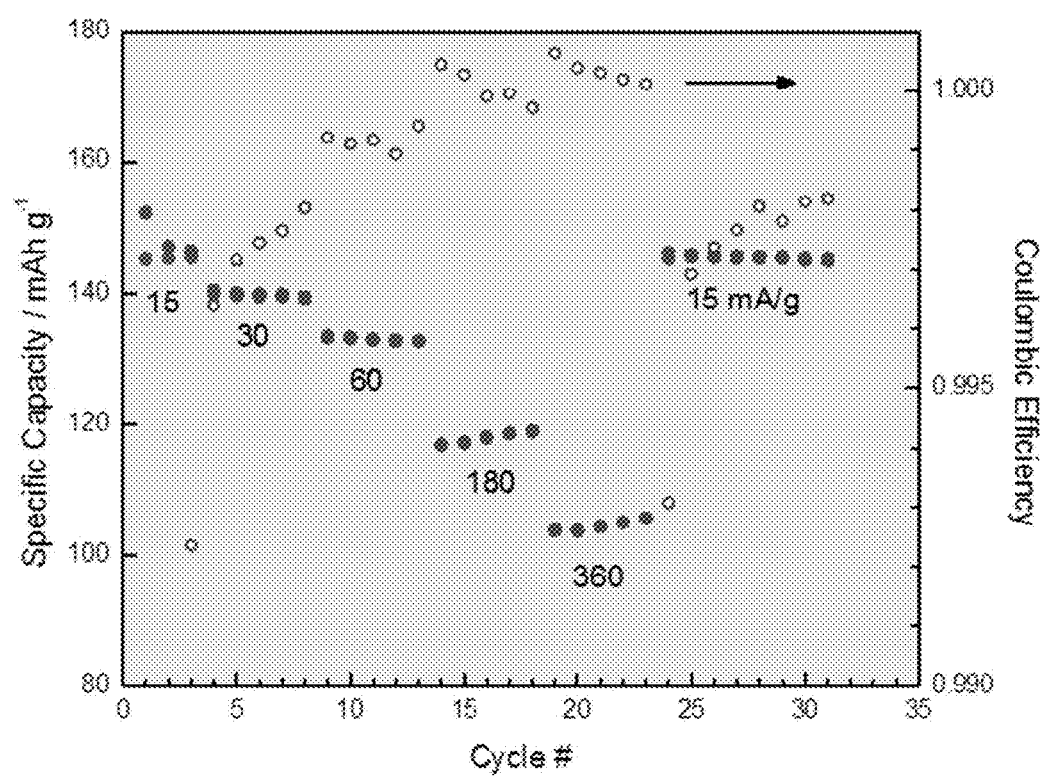
FIG. 2 is a plot of specific capacity and coulombic efficiency vs. cycle # for given lithium insertion rates for a lignin fiber cell with a binder.

The resulting capacities shown in FIG. 2 calculated based on the LCF mass in the coated electrodes.

Electrochemical characterization was also performed for LCF mats, where the LCFs are fused together during manufacturing to form electrical interconnections. The carbonized mats were dried in an inert atmosphere. The mats were weighed. Inside a glovebox with a water concentration below 1 ppm, the mats were inserted into a 2032 coin cell. Several drops of electrolyte were added until the mat was fully wetted. An electrolyte-saturated porous separator (manufactured by Celgard) was placed on top of the LCF. Lithium metal was placed on top of the separator, and the coin cell was crimped to form an air-tight seal. The electrolyte composition was 1.2 M LiPF6 in EC:DMC (3:7, by volume), a common composition for lithium ion batteries. The cells were galvanostatically cycled between 0.005 and 1.5 V. At the top of the lithium extraction step (1.5 V), cell voltages were maintained at 1.5 V until the current dropped to 5 µA or below. The rates used in each cycle are shown in Table 2.

TABLE 2

| Cycle #'s | Li Insertion and Extraction Rates (mA/g LCF) |
|---|---|
| 1-5 | 7.5 |
| 6-10 | 15 |
| 11-15 | 30 |
| 16-20 | 60 |
| 21-25 | 180 |
| 26-30 | 360 |
| 31-... | 15 |

Figure 3:
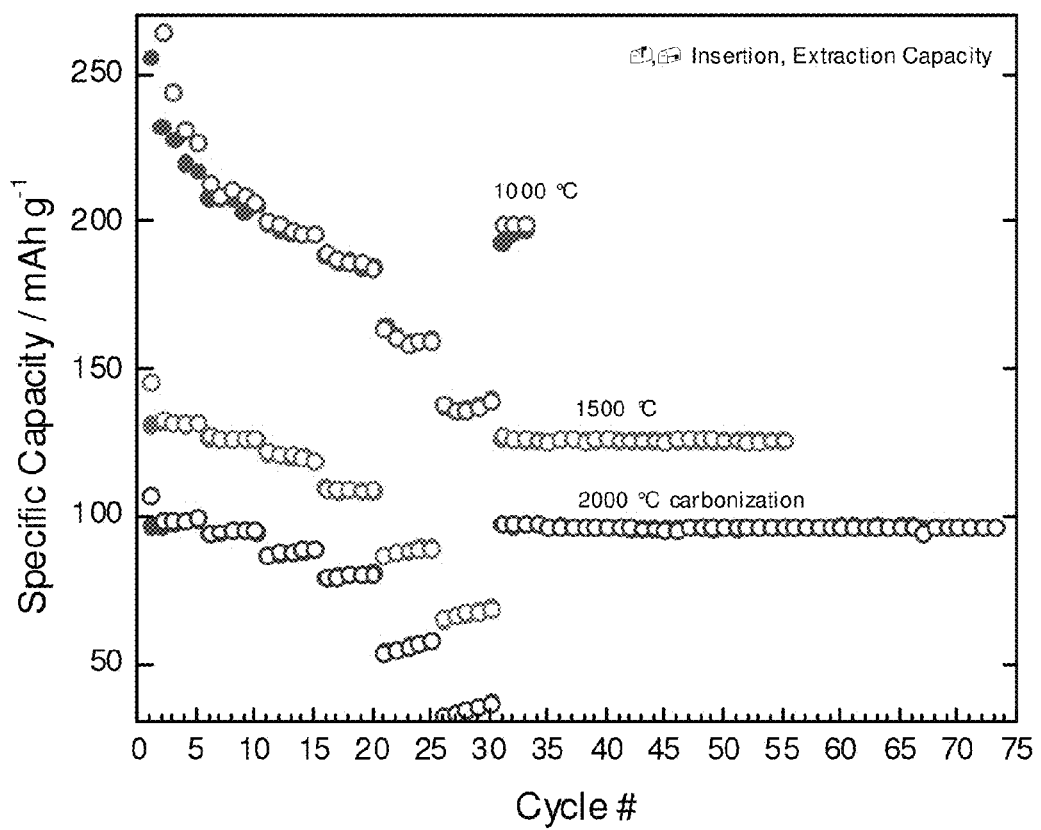
FIG. 3 is a plot of specific capacity vs cycle # for LCF mats carbonized at various temperatures.

The entire mass of the LCF mat was used to calculate the gravimetric capacities, which are shown in FIG. 3.

Figure 4:
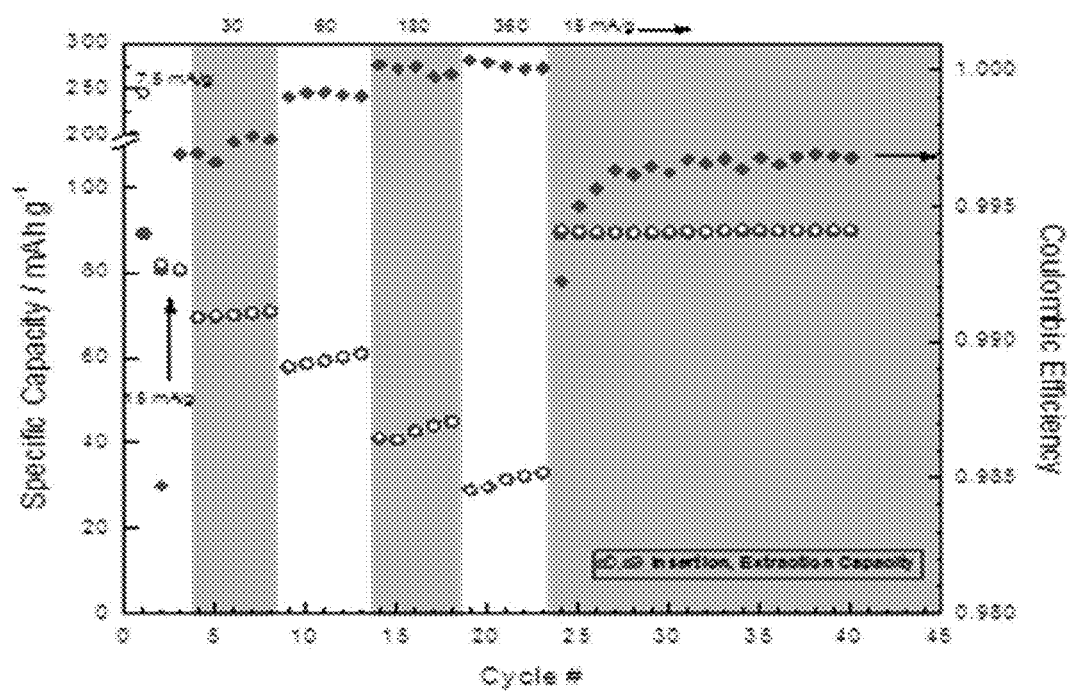
FIG. 4 is a plot of specific capacity and coulombic efficiency vs cycle # for an LCF mat carbonized at 2000° C. against Li metal in 1M LiPF$_6$ in PC.

The LCFs cycle reversibly in propylene carbonate electrolytes. Propylene carbonate (PC) is a desirable electrolyte or component in an electrolyte mixture due to its low temperature performance. PC is typically avoided in electrolytes for graphitic anodes because it exfoliates the graphite, which leads to poor cycling reversibility (low coulombic efficiencies and a higher irreversible capacity in the first cycle). Galvanostatic cycling of an LCF mat was performed in 1M $LiPF_6$ in PC. The LCF mat was carbonized at 2000° C. To evaluate the cycling performance of this LCF mat, the protocol above was followed. However, the PC electrolyte was exchanged for the EC:DMC mixture and a glass fiber separator instead of Celgard was used. The cycling rates were also slightly different. Comparison of the performance of the mat carbonized at 2000° C. in EC:DMC (FIG. 3) and PC (FIG. 4) reveals that the specific capacities are lower in PC. Also, there is a higher irreversible capacity (Irreversible Capacity=Lithiation–Extraction capacity) for the first cycle in PC.

Figure 13:
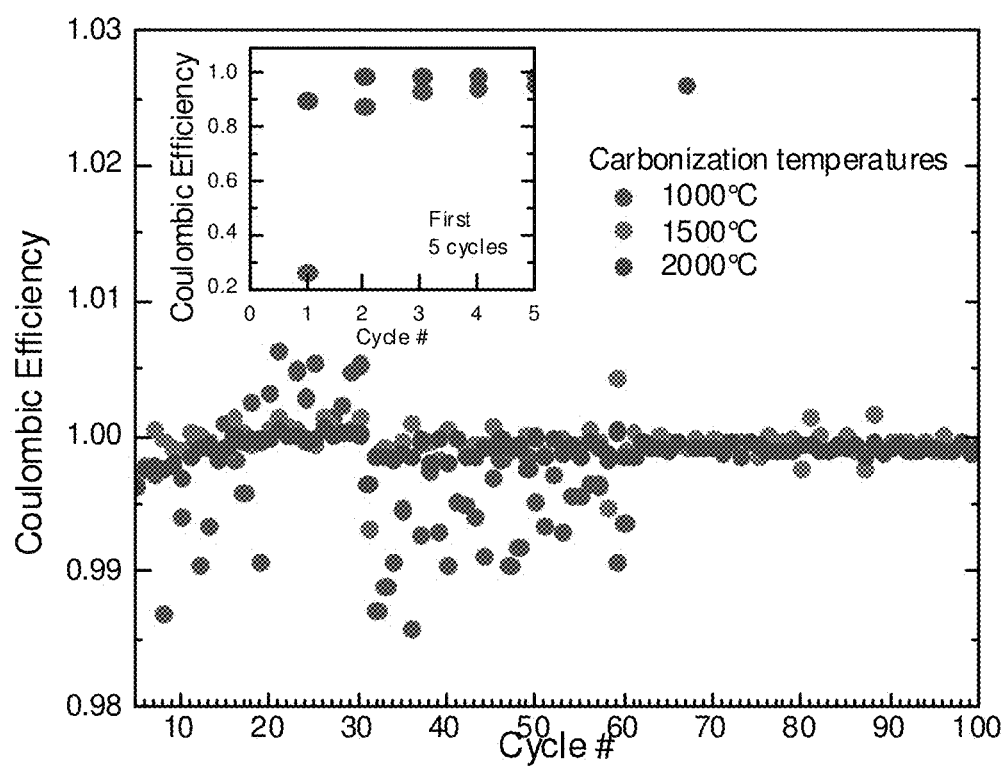
FIG. 13 is a plot of coulombic efficiency vs. cycle # of lignin-based carbon fibers fused into mats. Three different carbonization temperatures were characterized.

It is desirable to have coulombic efficiencies as close to 1 as possible (e.g. 0.999). High CEs are desirable because they are required for capacity retention over hundreds of cycles. For most cycles, the CE of LCF mats are above 0.99—closer to 0.999 for LCFs carbonized at 1500 and 2000° C. The coulombic efficiency of mats carbonized at 1000° C., 1500° C., and 2000° C. is shown in FIG. 13 (Experimental data below which show CE>1 is due to measurement error in the instruments.)

It is desirable to have a low irreversible capacity. It should be a small fraction of the stable reversible capacity. In Table 3 there are shown irreversible capacities for mats carbonized at 1000° C., 1500° C., and 2000° C.

TABLE 3

| Carbonization temperature | $1^{st}$ Cycle Irreversible Capacity $Q_{irr} = Q_{insertion} - Q_{extraction}$ | Fraction of $2^{nd}$ Extraction $\%_{irr} = Q_{irr}/Q_{extraction} \times 100$ |
|---|---|---|
| 1000 | 700.3 mAh g-1 | 270 |
| 1500 | 14.5 mAh g-1 | 11.0 |
| 2000 | 10.2 mAh g-1 | 10.5 |

The chemical properties of the starting material determine the microstructure of carbon fibers after carbonization. Thus modification of lignin precursors can be used to control the physical properties of the LCF anode material. On a molecular level, the process of carbonization involves thermal dehydration and decarboxylation processes in combination with condensation, polymerization and aromatization. Thermal degradation reactions of carboxyl and carbonyl functional groups yield volatile organics, $H_2O$, $CO_2$ and CO and may modulate microscale porosity. In general, when a highly porous carbon is formed at low temperatures most of its porosity is preserved on further heating. At higher temperatures the remaining carbonyl and carboxyl are incorporated into ester and anhydride linkages resulting in formation of aromatic carbon-carbon bonds. The detailed nature of these processes, as well as their relative significance during the course of carbonization, primarily depends on the chemical properties of the precursors. Lignin polymers contain a large amount of relatively easily accessible hydroxyl groups that can be used for introducing a variety of functional groups. Cost-effective chemical modification of lignin precursors can be used to control the properties of LCF for use as anode material for battery applications. Specifically, cost-effective chemical modification of lignin precursors by cyclic anhydrides such as succinic, maleic, or phthalic anhydride, can be used to optimize the properties of LCF for use as anode material. Precursor modification on LCF can be used to modify properties after carbonization, such as porosity, crystallinity and Li intercalation.

Chemicals used for the modification include acetic, succinic, maleic, or phthalic anhydride. The primary lignin type used is Alcell Lignin (Organosolv Lignin). After drying to remove any residual water, the lignin powder is dissolved in a dry, aprotic organic solvent. The optimal solvent is absolute tetrahydrofuran (THF dried over molecular sieves), but other solvents such as dioxane may be used.

Reaction: The typical reaction mixture contains 5 parts lignin and 1 to 3 parts of the anhydride by mass. The solvent volume is 6 to 10 mL per g of the lignin starting material. The reaction mixture is heated to a temperature between 60 and 70° C. (boiling point of THF) and kept under reflux for a period of 1 to 3 hours.

Downstream processing: After completion of the reaction, the volume of the reaction mixture can be reduced to about a third of the initial volume by distilling and recovering the THF solvent. The residue is cooled to room temperature and dissolved in methanol (10 mL per g of lignin). This mixture is added slowly and under vigorous stirring to a 5-6% solution of sodium chloride (NaCl) in water (200 mL per g of lignin). The resulting suspension is filtered over a glass frit, washed with water (10 mL per g of lignin) to remove residual reagent and NaCl and dried over a desiccant to obtain the modified lignin in a powdered form.

Figure 11:
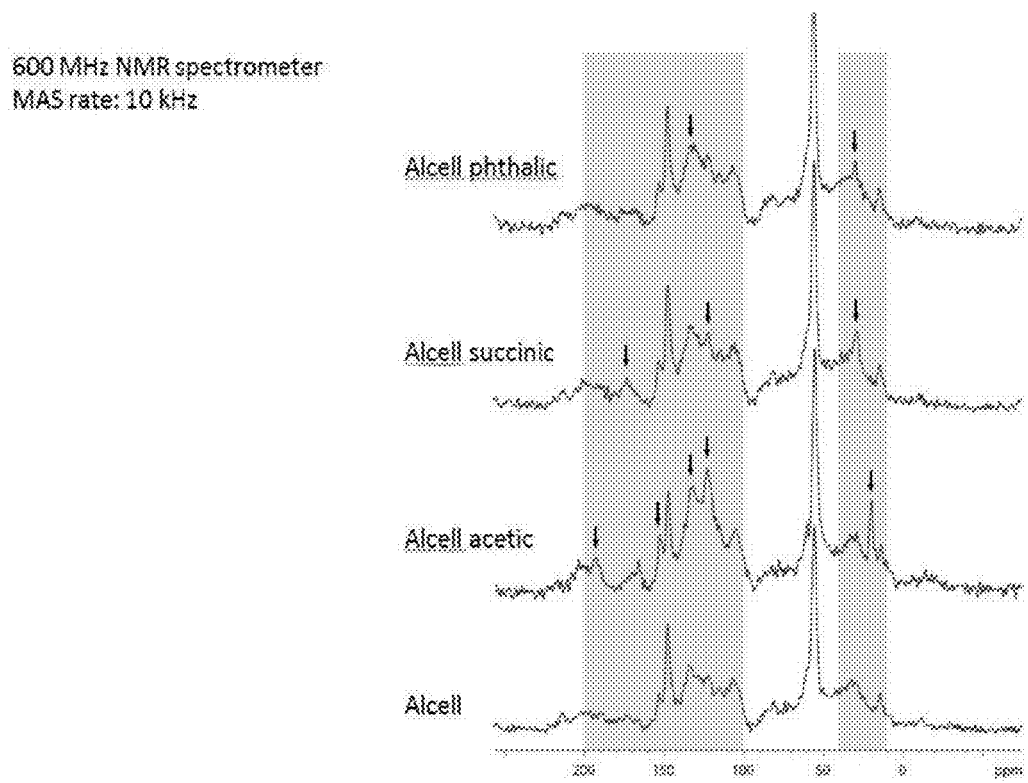
FIG. 11 are $^{13}$C CP-MAS NMR spectra of unmodified Alcell lignin and Alcell lignin chemically modified using acetic anhydride, succinic anhydride and phthalic anhydride.
Figure 12:
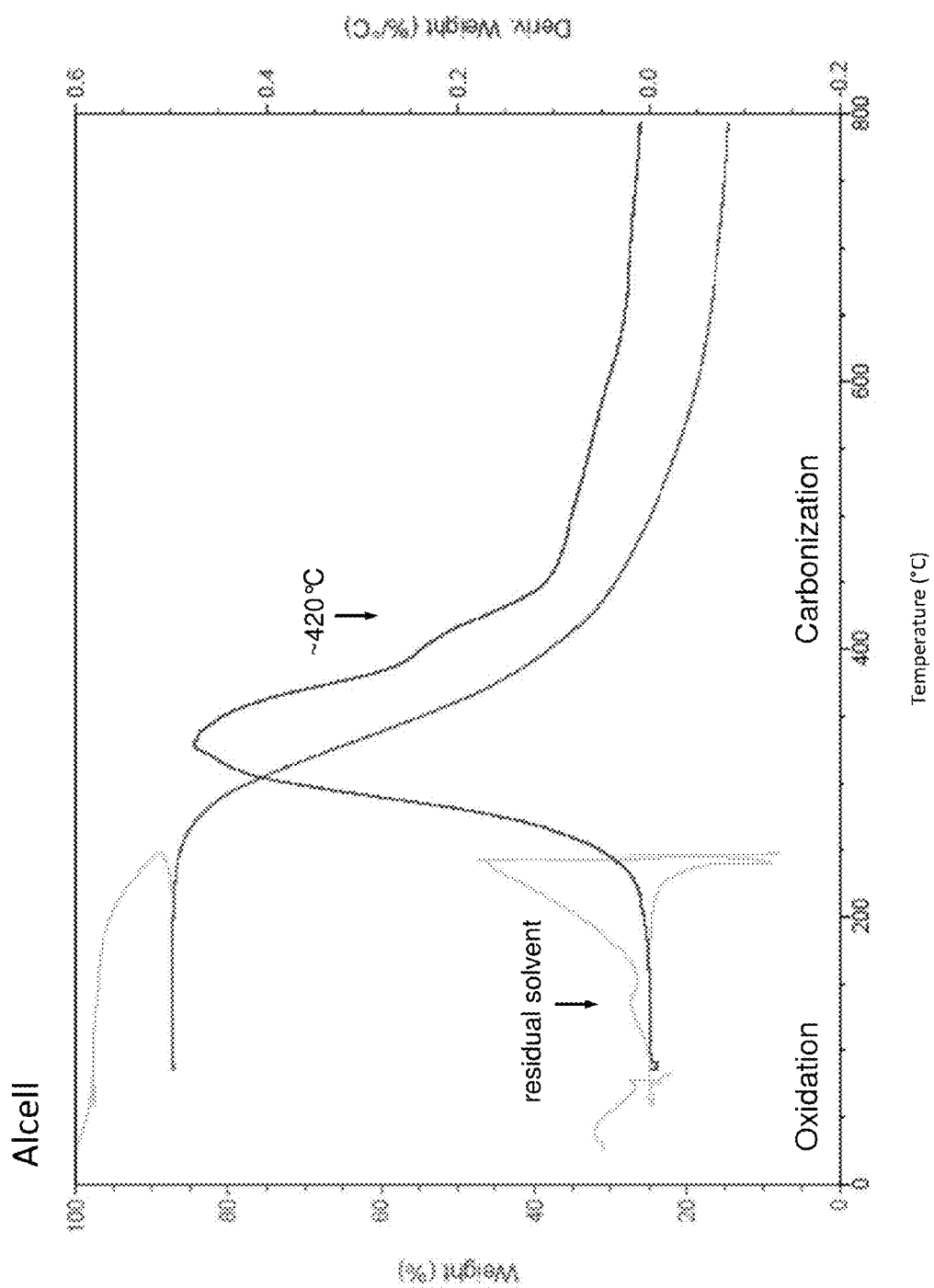
FIGS. 12A-12D are Thermogravimetric Analysis (TGA) plots of oxidation and carbonization data for unmodified Alcell lignin (FIG. 12A) and Alcell lignin chemically modified using acetic anhydride (FIG. 12B), succinic anhydride (FIG. 12C) and phthalic anhydride (FIG. 12D).
Figure 12:
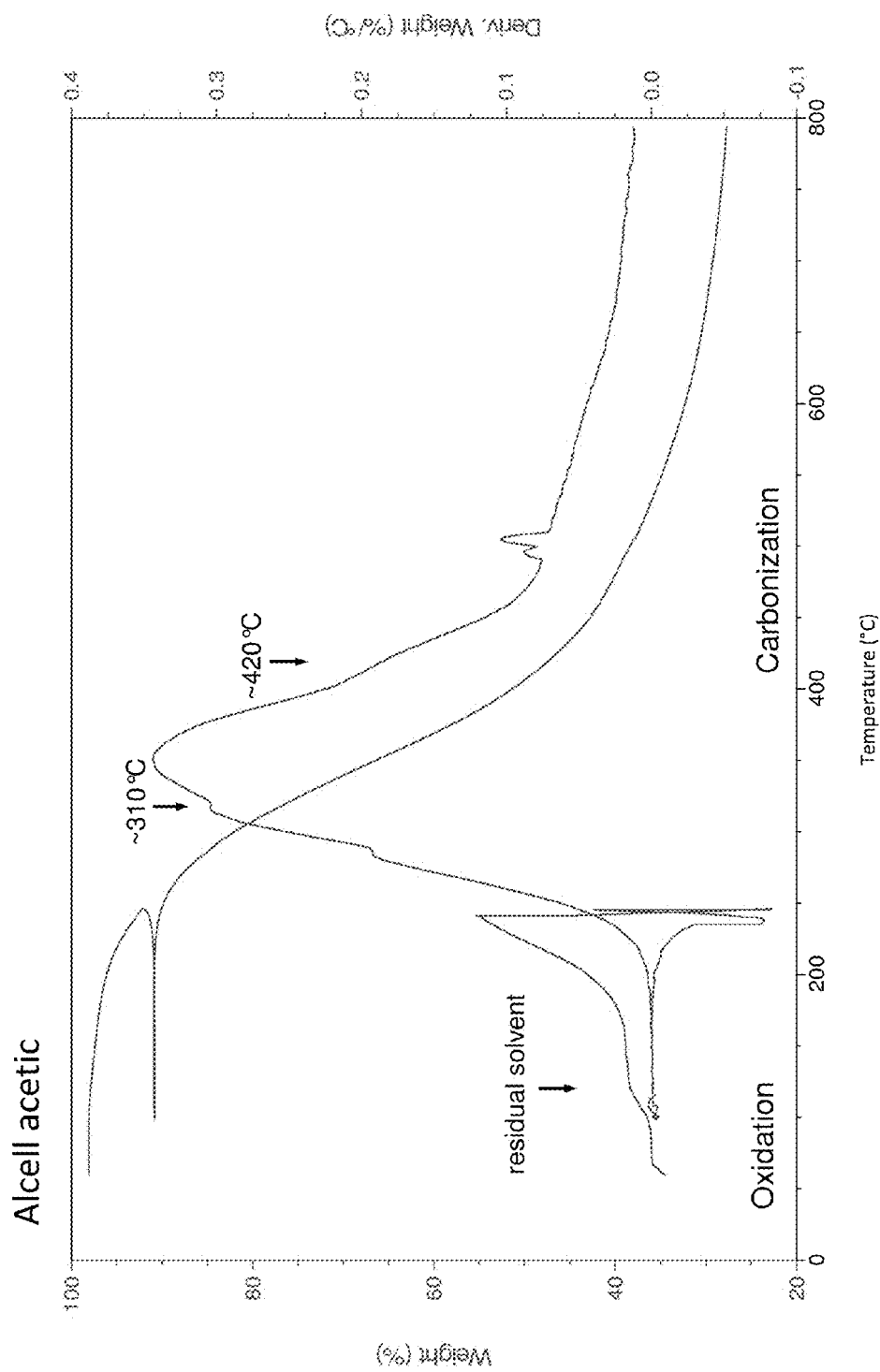
Figure 12:
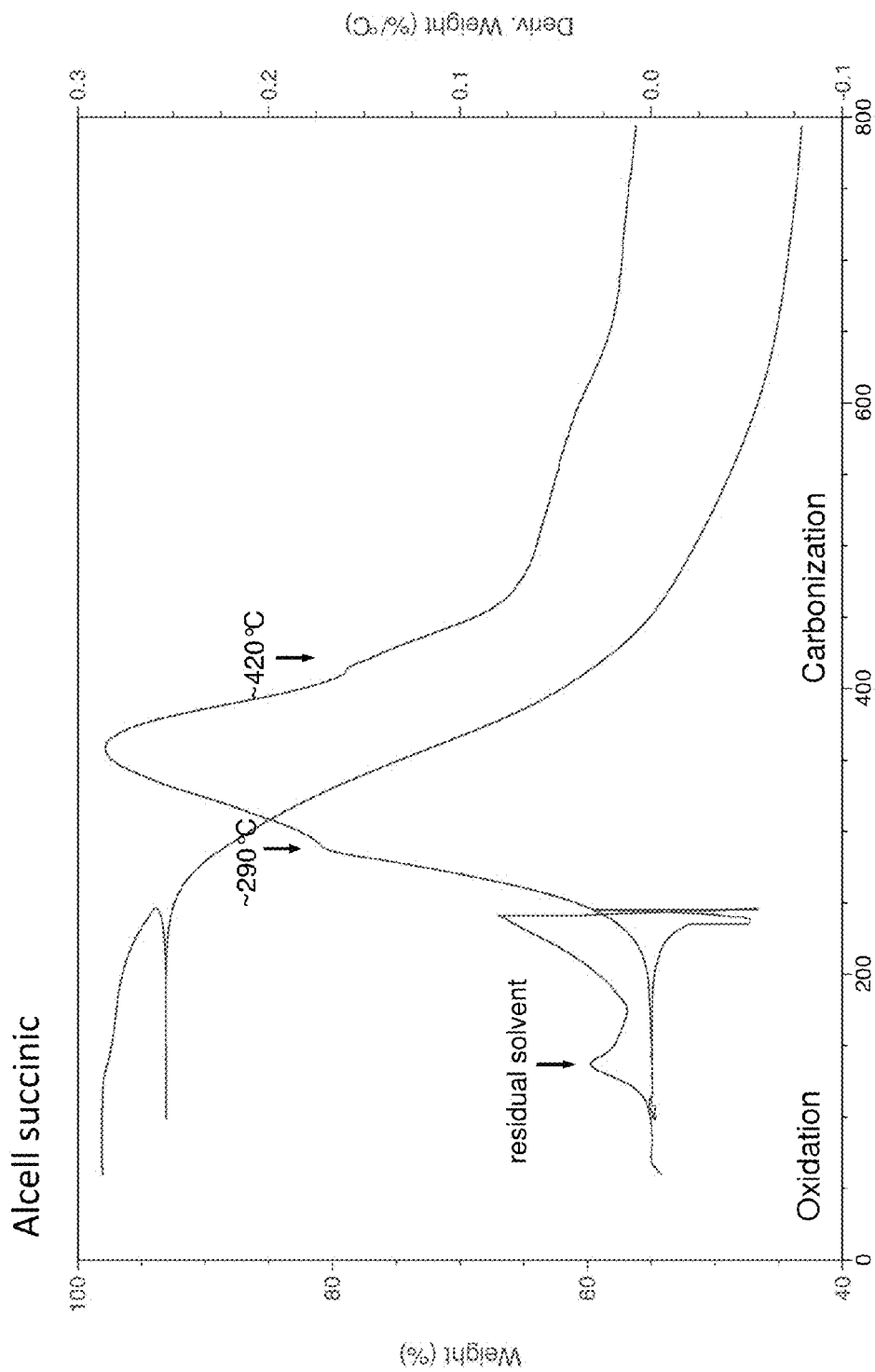
Figure 12:
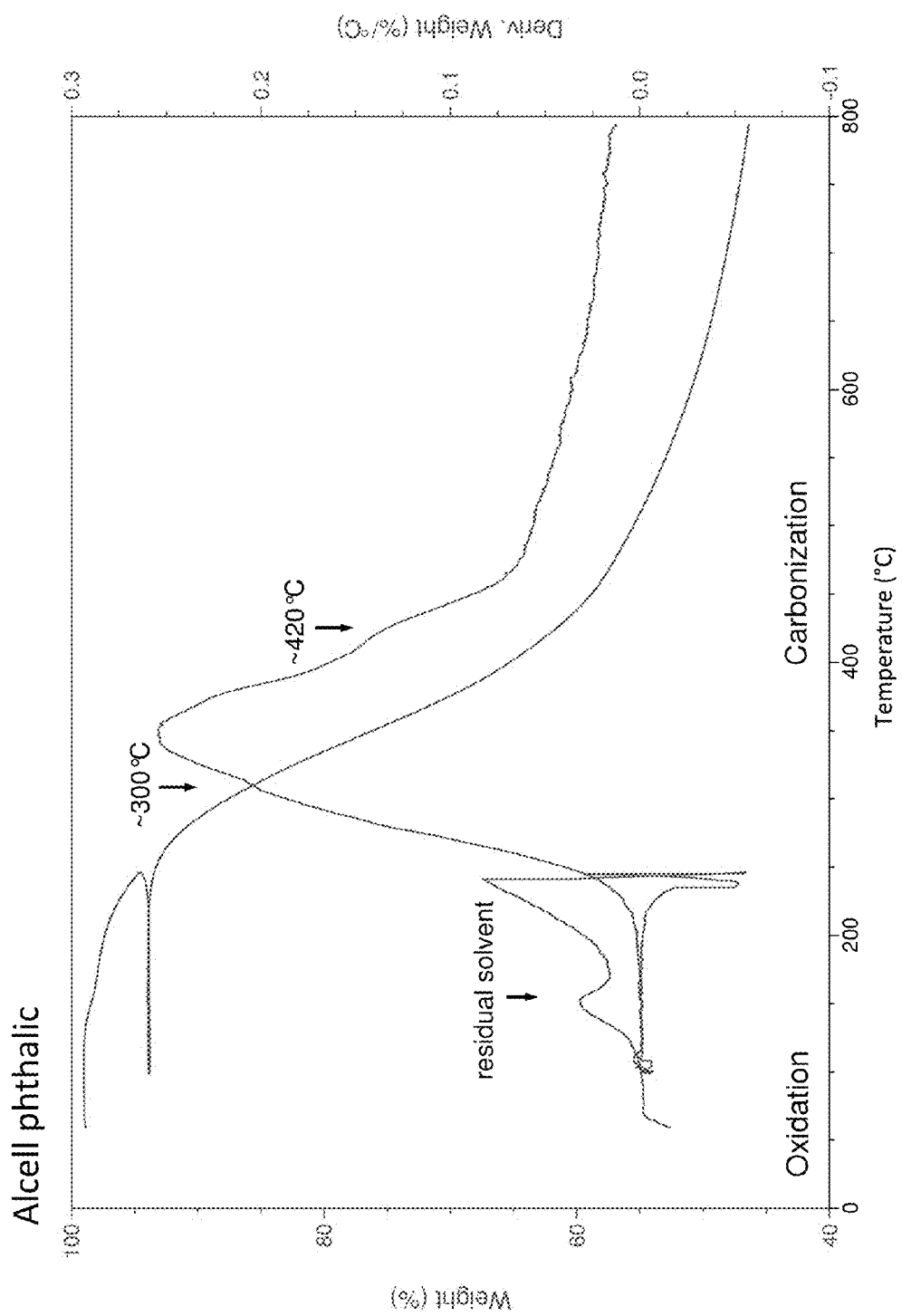

The large number of carbon environments in natural lignin samples results in spectral overlap and thus limits the accurate evaluation of natural polymers by $^{13}$C CP-MAS NMR. However, the chemical modification of lignin results in notable relative changes in the intensities of resonances depending on the chemical modification applied, as shown in FIG. 11. Characteristic spectral changes can be assigned to the methyl and carbonyl carbons of resulting acetoxy esters reflected in the intensity changes between 10 and 40 ppm and the region from 100 to 200 ppm.

Thermogravimetric analysis (TGA) measures the amount and rate of change in the mass of a sample as a function of temperature or time in a controlled atmosphere. The thermal stability of three modified Alcell lignins (acetic, succinic, phthalic) was determined and compared to the stability of unmodified Alcell lignin. Changes in the mass of the samples were recorded during oxidation in air from 20° C. to 250° C. and during subsequent carbonization from 250° C. to 800° C. (FIGS. 12A-12D). The oxidation stage shows a characteristic peak in the derivative weight, which reflects a loss of residual solvent from the sample. During the carbonization stage, the derivative weight profile exhibits a broad peak with a maximum at 330° C. and a shoulder at 420° C. for unmodified Alcell lignin. The main peak shifts to 350° C. for all modified lignins, while the shoulder remains at 420° C. The following additional shoulders appear in the derivative weight plots for modified Alcell lignins: Acetic anhydride—two shoulders at 280° C. and 310° C.; Succinic anhydride—one shoulder at 290° C.; Phthalic anhydride—one shoulder at 300° C. The results indicate an overall higher thermal stability of modified lignins and a temperature-dependent stepwise progression of carbonization facilitated by the introduction of new functional groups.

While there has been shown and described what are at present the preferred embodiments of the invention, various changes and modifications are possible without departing from the scope of the inventions defined by the appended claims.

We claim:

1. A method of making an anode, comprising the steps of:
providing fibers from a carbonaceous precursor, the carbonaceous fibers having a glass transition temperature $T_g$;
placing the carbonaceous fibers into a layered fiber mat;
fusing the fiber mat by heating the fiber mat to a temperature above the $T_g$ but no more than 20% above the $T_g$, wherein the temperature is sufficient to fuse fibers together at high energy fiber to fiber contact points and without melting the bulk fiber mat, to create a fused fiber mat;
carbonizing the fused fiber mat by heating the fused fiber mat to at least 650° C. under an inert atmosphere to create a carbonized fused fiber mat.

2. The method of claim 1, wherein the carbonaceous precursor fibers are lignin fibers.

3. The method of claim 1, wherein the carbonaceous fibers are at least one selected from the group consisting of melt spinnable and melt blowable fibers.

4. The method of claim 1, wherein the fibers have a diameter between 1 and 300 µm.

5. The method of claim 1, further comprising the step of incorporating the carbonized fused fiber mat as the anode of a battery.

6. The method of claim 1 wherein the fusing step comprises heating the fiber mat at heating rates of from 0.03° C./min to 10° C./min.

7. The method of claim 1, wherein the fusing step comprises heating the carbon fiber to between about 180 and about 300° C.

8. The method of claim 1, wherein the carbonizing step comprises heating the fused fiber mat at a rate of between 0.5° C./min and 500° C./min.

9. The method of claim 1, wherein the carbonizing step comprises heating the fused fiber mat to between 650° C. and 3000° C.

10. The method of claim 9, wherein the carbonizing step comprises determining a desired level of graphitization in the anode, and adjusting the carbonization temperature depending on the degree of carbonization, increasing graphitization being attained by increasing the carbonization temperature.

11. The method of claim 1, wherein the step of providing carbon fibers comprises mixing carbon nanotubes with the carbonaceous precursors to generate carbon nanotube composite fibers.

12. The method of claim 11, wherein the carbon nanotubes comprise between about 0.2% and about 10%, by weight.

13. The method of claim 1, wherein the step of providing carbon fibers comprises chemically modifying functional groups on the carbonaceous precursors.

14. The method of claim 13, wherein the chemical modification step comprises reacting the precursors with at least one selected from the group consisting of acetic anhydride, succinic anhydride, maleic anhydride and phthalic anhydride.

15. The method of claim 1, wherein the step of providing carbon fibers comprises providing a lignin precursor, and forming fibers from the lignin precursor.

16. The method of claim 15, wherein the lignin precursor is ground to produce a lignin powder.

17. The method of claim 16, wherein the lignin powder is extruded and cut into pellets, and the pellets are subjected to one of melt spinning and melt blowing to produce lignin fibers.

18. The method of claim 1, wherein the anode has a specific charge capacity of over 100 mAh g$^{-1}$ for at least 10 cycles.

19. The method of claim 1, wherein the anode has a reversible charge capacity of at least 100 mAh g$^{-1}$.

20. The method of claim 1, wherein the anode has a reversible charge capacity of at least 150 mAh g$^{-1}$.

* * * * *